United States Patent
Takahashi et al.

(10) Patent No.: US 12,253,939 B2
(45) Date of Patent: Mar. 18, 2025

(54) ELECTRONIC CONTROL UNIT, METHOD, AND STORAGE MEDIUM OF SETTING SHARED/DEDICATED AREA WRITE LIMIT BASED ON LIFE TIME CONSUMPTION INFORMATION

(71) Applicants: DENSO CORPORATION, Kariya (JP); TOYOTA JIDOSHA KABUSHIKI KAISHA, Toyota (JP)

(72) Inventors: Tomohiro Takahashi, Kariya (JP); Kenshi Inotani, Nagakute (JP); Norihide Kohmoto, Nisshin (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/342,777

(22) Filed: Jun. 28, 2023

(65) Prior Publication Data
US 2024/0004589 A1 Jan. 4, 2024

(30) Foreign Application Priority Data
Jul. 4, 2022 (JP) .................... 2022-107791

(51) Int. Cl.
*G06F 12/02* (2006.01)
(52) U.S. Cl.
CPC .. *G06F 12/0246* (2013.01); *G06F 2212/7206* (2013.01)

(58) Field of Classification Search
CPC ............... G06F 12/0246; G06F 2212/7206
See application file for complete search history.

(56) References Cited

U.S. PATENT DOCUMENTS

2017/0177217 A1* 6/2017 Kanno ................. G06F 3/0625
2023/0066561 A1* 3/2023 Kale .................. G06F 12/0646

FOREIGN PATENT DOCUMENTS

JP 2017-054306 A 3/2017

OTHER PUBLICATIONS

U.S. Appl. No. 18/342,769, filed Jun. 28, 2023, Takahashi et al.

* cited by examiner

*Primary Examiner* — Chie Yew
(74) *Attorney, Agent, or Firm* — Harness, Dickey & Pierce, P.L.C.

(57) ABSTRACT

By an electronic control unit including a storage that has a shared area shared by a plurality of unspecified applications and a dedicated area used by a predetermined specific application, a use limit notification method performed in the electronic control unit, a use limit notification method, life time consumption information related to life time consumption of the storage is acquired. a shared area write limit and a dedicated area write limit are set, and an application using the storage is notified of a use limit of the storage.

9 Claims, 10 Drawing Sheets

WRITE LIMIT TABLE

| WRITE LIMIT STATE (HEALTH STATUS INFORMATION) | WRITABLE/NON-WRITABLE | | | | | |
|---|---|---|---|---|---|---|
| | SHARED AREA | DEDICATED AREA | | | | |
| | | IMPORTANCE LEVEL 5 | IMPORTANCE LEVEL 4 | IMPORTANCE LEVEL 3 | IMPORTANCE LEVEL 2 | IMPORTANCE LEVEL 1 |
| NO LIMIT (0%-50%) | WRITABLE | WRITABLE | WRITABLE | WRITABLE | WRITABLE | WRITABLE |
| SHARED AREA WRITE LIMIT LEVEL 1 (50%-60%) | WRITABLE (UPPER LIMIT OF TOTAL WRITE AMOUNT = 1/2 OF NORMAL AMOUNT) | WRITABLE | WRITABLE | WRITABLE | WRITABLE | WRITABLE |
| SHARED AREA WRITE LIMIT LEVEL 2 (60%-70%) | WRITABLE (UPPER LIMIT OF TOTAL WRITE AMOUNT = 1/4 OF NORMAL AMOUNT) | WRITABLE | WRITABLE | WRITABLE | WRITABLE | WRITABLE |
| SHARED AREA WRITE PROHIBITION (70%-80%) | NON-WRITABLE | WRITABLE | WRITABLE | WRITABLE | WRITABLE | WRITABLE |
| DEDICATED AREA WRITE LIMIT LEVEL 1 (80%-90%) | NON-WRITABLE | WRITABLE | WRITABLE | WRITABLE | WRITABLE | NON-WRITABLE |
| DEDICATED AREA WRITE LIMIT LEVEL 2 (90%-100%) | NON-WRITABLE | WRITABLE | WRITABLE | WRITABLE | NON-WRITABLE | NON-WRITABLE |
| DEDICATED AREA WRITE PROHIBITION (100%) | NON-WRITABLE | NON-WRITABLE | NON-WRITABLE | NON-WRITABLE | NON-WRITABLE | NON-WRITABLE |

FIG. 2

APPLICATION MANAGEMENT TABLE

| APPLICATION NAME | SECUREMENT CAPACITY | SECUREMENT PERIOD | TOTAL WRITE AMOUNT | WRITTEN AMOUNT |
|---|---|---|---|---|
| APP A | 10MB | 1 MONTH | 200MB | 100MB |
| APP B | 100MB | 3 MONTHS | 1000MB | 50MB |

FIG. 3

WRITE LIMIT TABLE

| WRITE LIMIT STATE (HEALTH STATUS INFORMATION) | WRITABLE/NON-WRITABLE | | | | | | |
|---|---|---|---|---|---|---|---|
| | SHARED AREA | DEDICATED AREA | | | | | |
| | | IMPORTANCE LEVEL 5 | IMPORTANCE LEVEL 4 | IMPORTANCE LEVEL 3 | IMPORTANCE LEVEL 2 | IMPORTANCE LEVEL 1 | |
| NO LIMIT (0%–50%) | WRITABLE | WRITABLE | WRITABLE | WRITABLE | WRITABLE | WRITABLE |
| SHARED AREA WRITE LIMIT LEVEL 1 (50%–60%) | WRITABLE (UPPER LIMIT OF TOTAL WRITE AMOUNT = 1/2 OF NORMAL AMOUNT) | WRITABLE | WRITABLE | WRITABLE | WRITABLE | WRITABLE |
| SHARED AREA WRITE LIMIT LEVEL 2 (60%–70%) | WRITABLE (UPPER LIMIT OF TOTAL WRITE AMOUNT = 1/4 OF NORMAL AMOUNT) | WRITABLE | WRITABLE | WRITABLE | WRITABLE | WRITABLE |
| SHARED AREA WRITE PROHIBITION (70%–80%) | NON-WRITABLE | WRITABLE | WRITABLE | WRITABLE | WRITABLE | WRITABLE |
| DEDICATED AREA WRITE LIMIT LEVEL 1 (80%–90%) | NON-WRITABLE | WRITABLE | WRITABLE | WRITABLE | WRITABLE | NON-WRITABLE |
| DEDICATED AREA WRITE LIMIT LEVEL 2 (90%–100%) | NON-WRITABLE | WRITABLE | WRITABLE | NON-WRITABLE | NON-WRITABLE | NON-WRITABLE |
| DEDICATED AREA WRITE PROHIBITION (100%) | NON-WRITABLE | NON-WRITABLE | NON-WRITABLE | NON-WRITABLE | NON-WRITABLE | NON-WRITABLE |

FIG. 4

| | SECTION | MEANING |
|---|---|---|
| HEALTH STATUS INFORMATION | 0, 10, 20, 30, 40, 50, 60, 70, 80, 90, 100 | PROVIDE NOTIFICATION OF LIFETIME CONSUMPTION OF STORAGE AS PERCENTAGE REMAINING LIFETIME BECOMES LOWER AS APPROACHING 100 NUMERICAL VALUE INCREASES FOR EACH STORAGE WRITE |
| WRITE LIMIT STATE | NO LIMIT<br>SHARED AREA WRITE LIMIT LEVEL 1<br>SHARED AREA WRITE LIMIT LEVEL 2<br>SHARED AREA WRITE PROHIBITION<br>DEDICATED AREA WRITE LIMIT STATE LEVEL 1<br>DEDICATED AREA WRITE LIMIT STATE LEVEL 2<br>DEDICATED AREA WRITE PROHIBITION | PROVIDE NOTIFICATION OF WRITE LIMIT STATE ACCORDING TO HEALTH STATUS INFORMATION |

DELETION INSTRUCTION ACCEPTANCE PROCESS

WRITE CONFIRMATION ACCEPTANCE PROCESS

ELECTRONIC CONTROL UNIT, METHOD, AND STORAGE MEDIUM OF SETTING SHARED/DEDICATED AREA WRITE LIMIT BASED ON LIFE TIME CONSUMPTION INFORMATION

CROSS REFERENCE TO RELATED APPLICATION

The present application claims the benefit of priority from Japanese Patent Application No. 2022-107791 filed on Jul. 4, 2022. The entire disclosure of the above application is incorporated herein by reference.

TECHNICAL FIELD

The present disclosure relates to an electronic control unit, a use limit notification method, and a use limit notification program.

BACKGROUND

For example, an in-vehicle electronic control unit (hereinafter referred to as an ECU) is configured to store various data in a storage of a subject device. In a comparative example, a NAND flash memory or a NOR flash memory is employed as the storage.

SUMMARY

By an electronic control unit including a storage that has a shared area shared by a plurality of unspecified applications and a dedicated area used by a predetermined specific application, a use limit notification method performed in the electronic control unit, a use limit notification method, life time consumption information related to life time consumption of the storage is acquired, a shared area write limit and a dedicated area write limit are set, and an application using the storage is notified of a use limit of the storage.

BRIEF DESCRIPTION OF DRAWINGS

FIG. 2 is a diagram showing an application management table.

FIG. 3 is a diagram showing a write limit table.

FIG. 4 is a diagram showing a write limit table.

DETAILED DESCRIPTION

Figure 1:
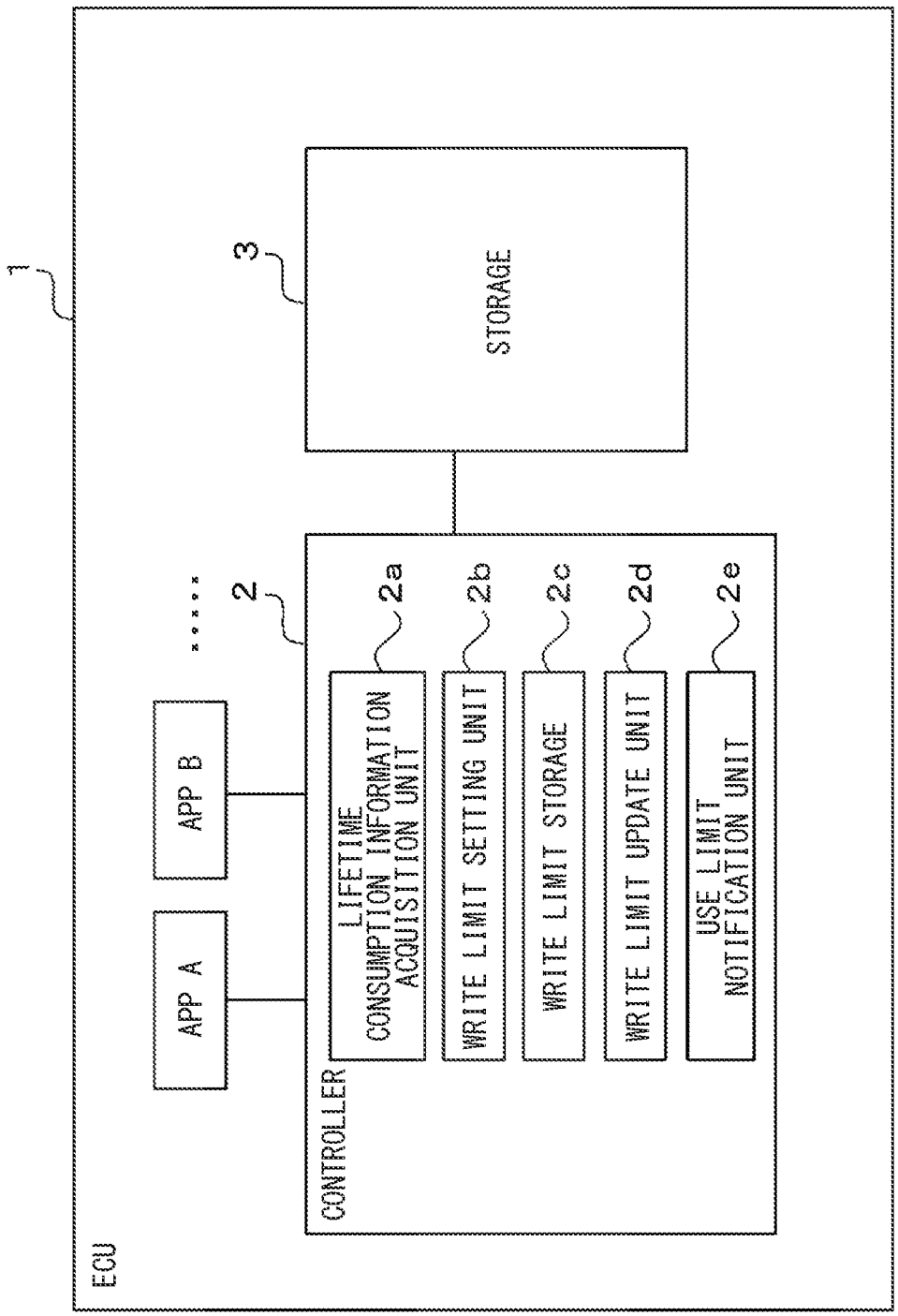
FIG. 1 is a functional block diagram showing an embodiment.

The NAND type flash memory and the NOR type flash memory have a life time for data writing. When the data writing reaches the end of its life time according to the access from the application to the storage, the data cannot be written. In this regard, it is conceivable to extend the life time of the storage attached to the subject device by a method of writing data to a storage different from the storage attached to the subject device or a method of uploading data to a cloud. However, these methods have difficulties such as a need to prepare a different storage and a need to prepare an additional area when uploading data to the cloud.

One example of the present disclosure provides an electronic control unit, a use limit notification method, and a use limit notification program capable of appropriately extending the life time of a storage attached to a subject vehicle.

According to one example embodiment of the present disclosure, a storage has a shared area capable of being shared and used by a plurality of unspecified applications and a dedicated area capable of being used by a predetermined specific application. A life time consumption information acquisition unit acquires life consumption information related to life time consumption of the storage. A write limit setting unit sets a shared area write limit on data write to the shared area when the life time consumption information reaches a first threshold, and sets a dedicated area write limit on data write to the dedicated area when the life consumption information reaches a second threshold higher than the first threshold. A use limit notification unit notifies an application using the storage of a use limit of the storage according to the shared area write limit or the dedicated area write limit.

According to another example embodiment of the present disclosure, a use limit notification method is performed in an electronic control unit including a storage that has a shared area capable of being shared and used by a plurality of unspecified applications and a dedicated area capable of being used by a predetermined specific application. The method includes: acquiring life time consumption information related to life time consumption of the storage; setting a shared area write limit on data write to the shared area when the life time consumption information reaches a first threshold, and setting a dedicated area write limit on data write to the dedicated area when the life time consumption information reaches a second threshold higher than the first threshold; and notifying an application using the storage of a use limit of the storage according to the shared area write limit or the dedicated area write limit.

Further, according to another example embodiment of the present disclosure, a computer-readable non-transitory storage medium stores a use limit notification program causing a controller of an electronic control unit including a storage that has a shared area capable of being shared and used by a plurality of unspecified applications and a dedicated area capable of being used by a predetermined specific application, to: acquire life time consumption information related to life time consumption of the storage; set a shared area write limit on data write to the shared area when the life time consumption information reaches a first threshold, and set a dedicated area write limit on data write to the dedicated area when the life time consumption information reaches a second threshold higher than the first threshold; and notify an application using the storage of a use limit of the storage according to the shared area write limit or the dedicated area write limit.

The life time consumption information related to the life time consumption of the storage is acquired. When the life time consumption information reaches the first threshold, the limit on the data write to the shared area is set. When the life time consumption information reaches the second threshold that is larger than the first threshold, the limit on data write to the dedicated area is set. The application using the storage is notified of the use limit of the storage according to the set write limit. The limits of the data write to the shared area and the dedicated area in the storage are set. By notifying the application using the storage of the use limit of the storage according to the set write limit, it is possible to limit the access from the application to the storage. Thereby, it is possible to appropriately extend the life time of the storage attached to the subject device.

Hereinafter, one embodiment will be described with reference to the drawings. As shown in FIG. 1, an ECU 1 mounted on a vehicle is, for example, an integration management ECU that integrally manages multiple ECUs (not shown), and has a function as a central gateway. The ECU 1 is connected to multiple ECUs via an in-vehicle network so as to enable data communication, and the ECU 1 integrally manages the multiple ECUs by instructing an operation command to the multiple ECUs, acquiring an operation state of the multiple ECUs and the like. The in-vehicle network is, for example, CAN (Controller Area Network, registered trademark), Ethernet (registered trademark), LIN, CXPI (Clock Extension Peripheral Interface, registered trademark), FLEXRAY (registered trademark), MOST (Media Oriented Systems Transport, registered trademark), or the like.

The ECU 1 includes a controller 2 and a storage 3. The controller 2 is provided by a microcomputer having a CPU (Central Process Unit), a ROM (Read Only Memory), a RAM (Random Access Memory), and an I-O (Input-Output). By executing a control program stored in a non-transitory tangible storage medium, the controller 2 executes a process corresponding to the control program, and controls the overall operation of the ECU 1. The control program executed by the controller 2 includes a use limit notification program.

The storage 3 is shared by multiple applications executed by the controller 2. That is, multiple applications each access the storage 3 to write and read data. The storage 3 includes a shared area and a dedicated area as data storage areas.

The shared area is an area that can be used by an unspecified application that has notified the controller 2 of an area securement request. The shared area is an area shared by unspecified applications, and is used, for example, to store data that is not essential for operating as a function. The application using the shared area is neither determined nor limited in advance, and notifies the controller 2 of the application name, the secured capacity for which the area is desired to be secured, the use period, and the total amount of writing. As shown in FIG. 2, the controller 2 manages application information using an application management table. After acquiring the application name, the securement capacity, the use period, and the total amount of writing notified from the application that uses the shared area, the controller 2 adds the acquired items to the application management table as a record unit, and updates the written amount according to the progress of data writing.

The dedicated area is an area that can be used by a specified application that has notified the controller 2 of an area securement request. The dedicated area is an area exclusively used by the specified application, and is used, for example, to store data that is essential for operating as a function. The application that uses the dedicated area is determined in advance.

The shared area and the dedicated area may be obtained by physically dividing one storage area in units of memory cells, or may be obtained by dividing into one physical storage area in chronological order. When one storage area is physically divided in chronological order, memory cells used as a dedicated area for a specific period may be used as a shared area for another specific period. A memory cell that has been used as a dedicated area for the specific period may be used as a shared area for another specific period. Switching between the shared area and the dedicated area can be adjusted by wear leveling.

The storage 3 is an eMMC (embedded Multi Media Card) conforming to a standard of the JEDEC (Joint Electron Device Engineering Council). A version of the standard is 5.0 or later. The storage 3 notifies the controller 2 of health status information (Device Life Time Estimation Type A/B) of the eMMC driver. The health status information indicates the life time consumption of the storage 3, for example, as a percentage, and is life time consumption information related to the life time consumption of the storage. The storage 3 notifies the controller 2 of the health status information each time its own life time consumption increases by "10%", for example.

Although the configuration in which the storage 3 is built in the ECU 1 is exemplified in the present embodiment, it may be also possible to apply a configuration in which the storage 3 is arranged outside the ECU 1. Further, although the configuration in which the storage 3 is shared by multiple applications executed by the controller 2 is illustrated, the application executed by the control unit of another ECU connected to the ECU 1 for data communication may share the storage 3.

The controller 2 includes a life time consumption information acquisition unit 2a, a write limit setting unit 2b, a write limit storage 2c, a write limit update unit 2d, and a use limit notification unit 2e. These units 2a to 2e constitute a use limit notification program. The life time consumption information acquisition unit 2a acquires the health status information when notified of the health status information from the storage 3. When the health status information is acquired by the life time consumption information acquisition unit 2a, the write limit setting unit 2b sets a limit on data writing to the storage 3 based on the acquired health status information. The write limit setting unit 2b may acquire, as the life time consumption information, information according to the number of data write times. The write limit storage 2c stores a write limit table indicating write limits of a shared area write limit and a dedicated area write limit. The write limit update unit 2d updates write limits stored in the write limit table. When the limit of the data write to the storage 3 is set by the write limit setting unit 2b, the use limit notification unit 2e notifies the application using the storage 3 of the use limit of the storage 3 according to the write limit.

As shown in FIGS. 3 and 4, the controller 2 manages storage-related information regarding the storage 3 using the write limit table. In the write limit table, a write limit state is classified according to the numerical value of the health status information. The write limit state is classified into "no limit", "shared area write limit level 1", "shared area write limit level 2", "shared area write prohibition", "dedicated area write limit level 1", "dedicated area write limit level 2", "dedicated area write limit level 2", and "dedicated area write prohibition". Either a writable state or a non-writable state is set to the shared area and the dedicated area according to the classification of the write limit state. The non-writable state may be also referred to as a read-only state.

In an example of FIG. 3, for example, the life time consumption state indicated by the health status information is "no limit" in the section of "0% to 50%", the shared area is "writable", and the dedicated area is also "writable" regardless of the importance level of the data. For example, the section of the life time consumption state of "60% to 70%" is the "shared area write limit level 2", and the shared area is "writable under a condition that the upper limit of the total amount of writing is ¼ of the normal amount". The dedicated area is "writable" regardless of the importance level of the data. For example, the section of the life time consumption state is "80% to 90%", the "dedicated area write limit level 1", the shared area is "non-writable". For the "2" to "5" of data importance levels, the dedicated area is "writable". For the "1" among the data importance levels, the dedicated area is "non-writable". The importance level of data indicates that the higher the numerical value, the higher the importance of the data.

In the example of FIG. 3, since the life time consumption state of the shared area is divided into "writable" and "non-writable" with "70%" as the boundary. The "70%" is a first threshold. As for the dedicated area, a second threshold differs according to the importance level of the data. For the data importance level "1" of the dedicated area, the life time consumption state is divided into "writable" and "non-writable" with "80%" as the boundary. The "80%" is a second threshold. For the data importance level "2" of the dedicated area, the life time consumption state is divided into "writable" and "non-writable" with "90%" as the boundary. The "90%" is the second threshold. For the data importance levels "1" to "5" of the dedicated area, the life time consumption state is divided into "writable" and "non-writable" with "100%" as the boundary. The "100%" is the second threshold.

A function of the configuration will be described with reference to FIGS. 5 to 12. The controller 2 executes a startup process, a health status information notification process, an area securement request acceptance process, an open instruction acceptance process, a write instruction acceptance process, a flash instruction acceptance process, a deletion instruction acceptance process, and a write confirmation acceptance process. Hereinafter, each process will be described in sequence.

Figure 5:
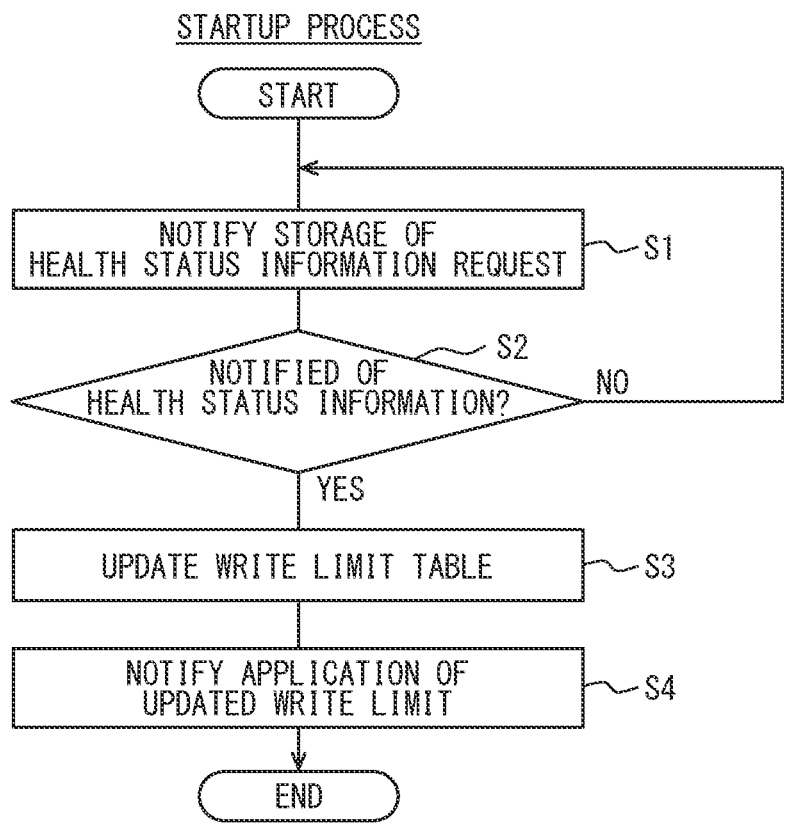
FIG. 5 is a flowchart showing a startup process.

(1) Startup Process (See FIG. 5)

When the controller 2 starts up, the controller 2 starts the startup process, notifies a health status information request to the storage 3 (S1), and waits for notification of the health status information from the storage 3 (S2). When determining that the health status information has been notified from the storage 3 (S2: YES, corresponding to a life time consumption information acquisition process), the controller 2 updates the write limit table based on the notified health status information (S3, corresponding to a use limit notification process). The controller 2 notifies the application of the updated write limit (S4, corresponding to a use limit notification process), and ends the startup process. That is, the application that uses the storage specifies whether writing is possible by being notified of the updated write limit after the startup of the controller 2.

Figure 6:
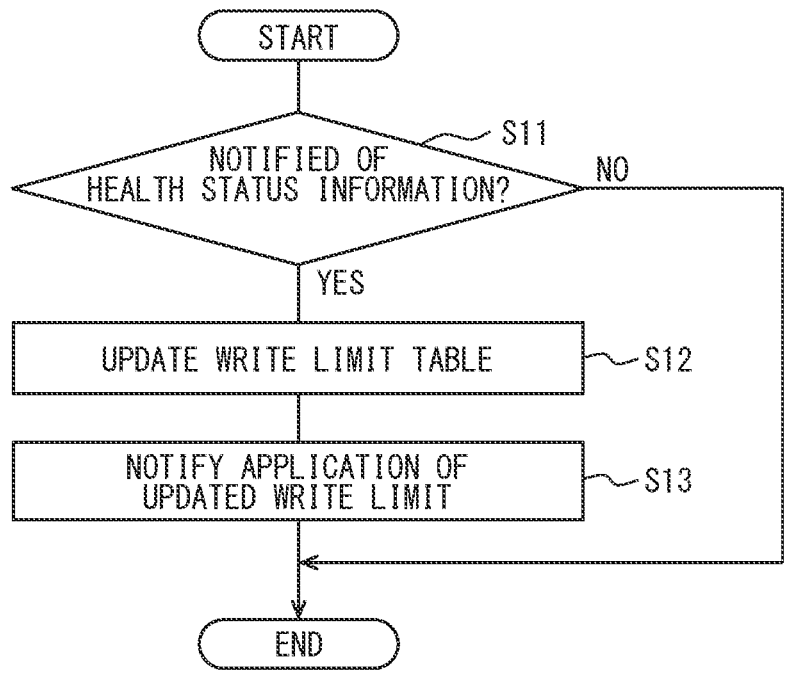
FIG. 6 is a flowchart showing a health status information notification process.

(2) Health Status Information Notification Process (See FIG. 6)

When a condition for starting the health status information notification process is satisfied, the controller 2 starts the health status information notification process, and determines whether the health status information has been notified from the storage 3 (S11). When determining that the health status information has not been notified from the storage 3 (S11: NO), the controller 2 ends the health status information notification process and waits until the condition for starting the next health status information notification process is satisfied.

When determining that the health status information has been notified from the storage 3 (S11: YES), the controller 2 updates the write limit table based on the notified health status information (S12, corresponding to a write limit setting process). When notifying the application of the updated write limit (S13), the controller 2 ends the health status information notification process and waits until the condition for starting the next health status information notification process is satisfied. That is, the application that uses the storage specifies whether writing is possible by being notified of the updated write limit after the startup of the controller 2 in accordance with the notification of the health status information from the storage 3 to the controller 2.

Figure 7:
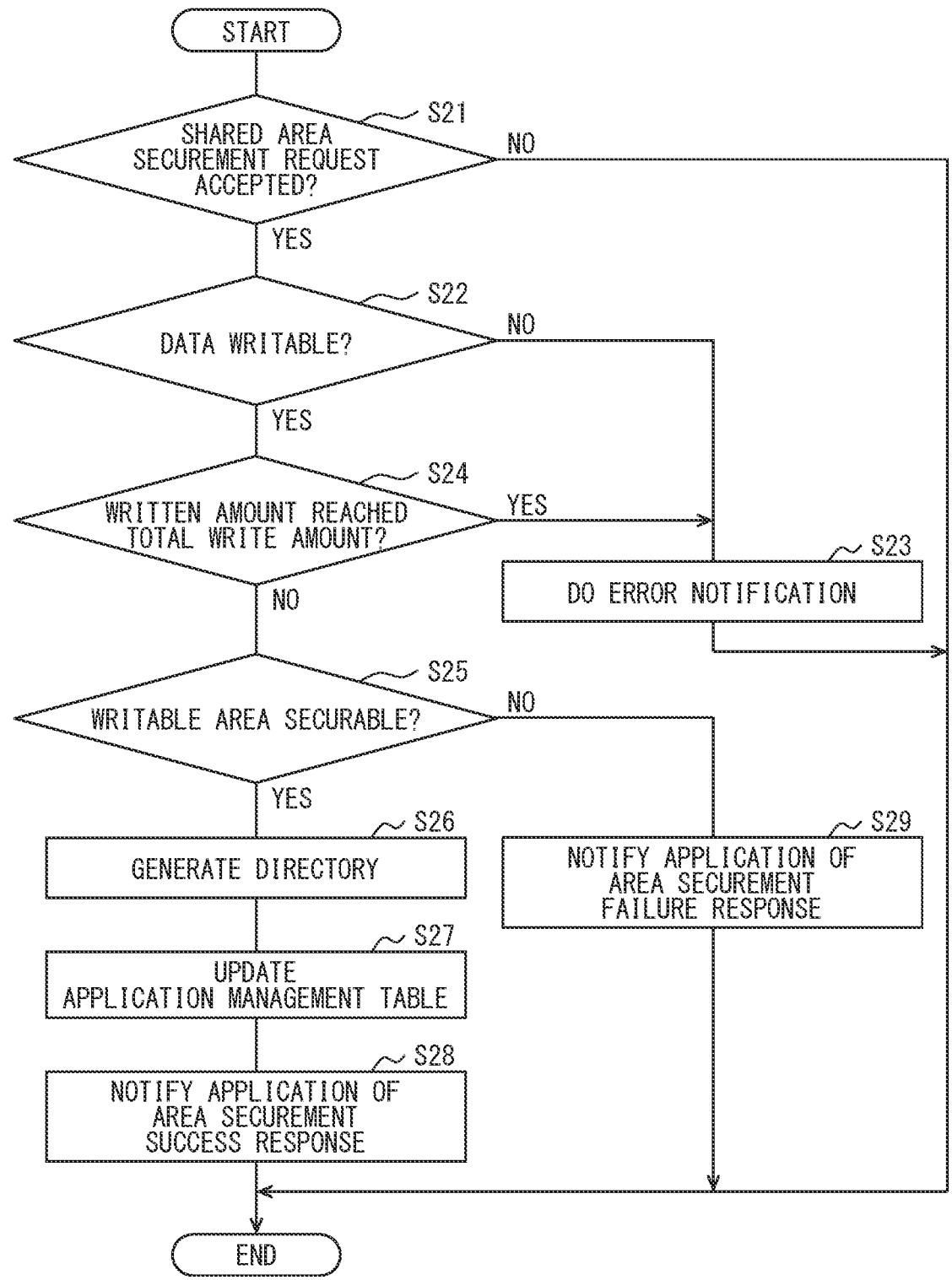
FIG. 7 is a flowchart showing an area securement request reception process.

(3) Area Securement Request Acceptance Process (See FIG. 7)

When a condition for starting an area securement request acceptance process is satisfied, the controller 2 starts the area securement request acceptance process, and determines whether the area securement request for the shared area from the application has been accepted (S21). When determining that the area securement request for the shared area from the application has not been accepted (S21: NO), the controller 2 ends the area securement request acceptance process and waits until a condition for starting the next area securement request acceptance process is satisfied.

When determining that the area securement request for the shared area has been accepted from the application (S21: YES), the controller 2 determines whether data can be written based on the write limit table (S22). When determining that the data is not writable (S22: NO), the controller 2 provides an error notification (S23), ends the area securement request acceptance process, and waits until the condition for starting the next area securement request acceptance process is satisfied.

When determining that the data is writable (S22: YES), the controller 2 compares the written amount with the total write amount, and determines whether the written amount has reached the total write amount (S24). When determining that the written amount has reached the total write amount (S24: YES), the controller 2 also provides the error notification (S23), ends the area securement request acceptance process, and waits until the condition for starting the next area securement request acceptance process is satisfied.

When determining that the written amount has not reached the total write amount (S24: NO), the controller 2 compares the secured capacity designated by the area securement request with the capacity of the writable free area to determine whether the data writable area can be secured (S25). When determining that the capacity of the free area exceeds the secured capacity and that the data writable area can be secured (S25: YES), the controller 2 generates a directory to be used by the application that notified of the area securement request (S26), and updates the application management table (S27). When notifying the application of the area securement success response indicating the success of the area securement (S28), the controller 2 ends the area securement request acceptance process and waits until a condition for starting the next area securement request acceptance process is satisfied.

When determining that the free area capacity does not exceed the secured capacity and that the data writable area cannot be secured (S25: NO), the controller 2 notifies the application of an area securement failure response indicating that the area securement has failed (S29), ends the area securement request acceptance process, and waits until the condition for starting the next area securement request acceptance process is satisfied.

Figure 8:
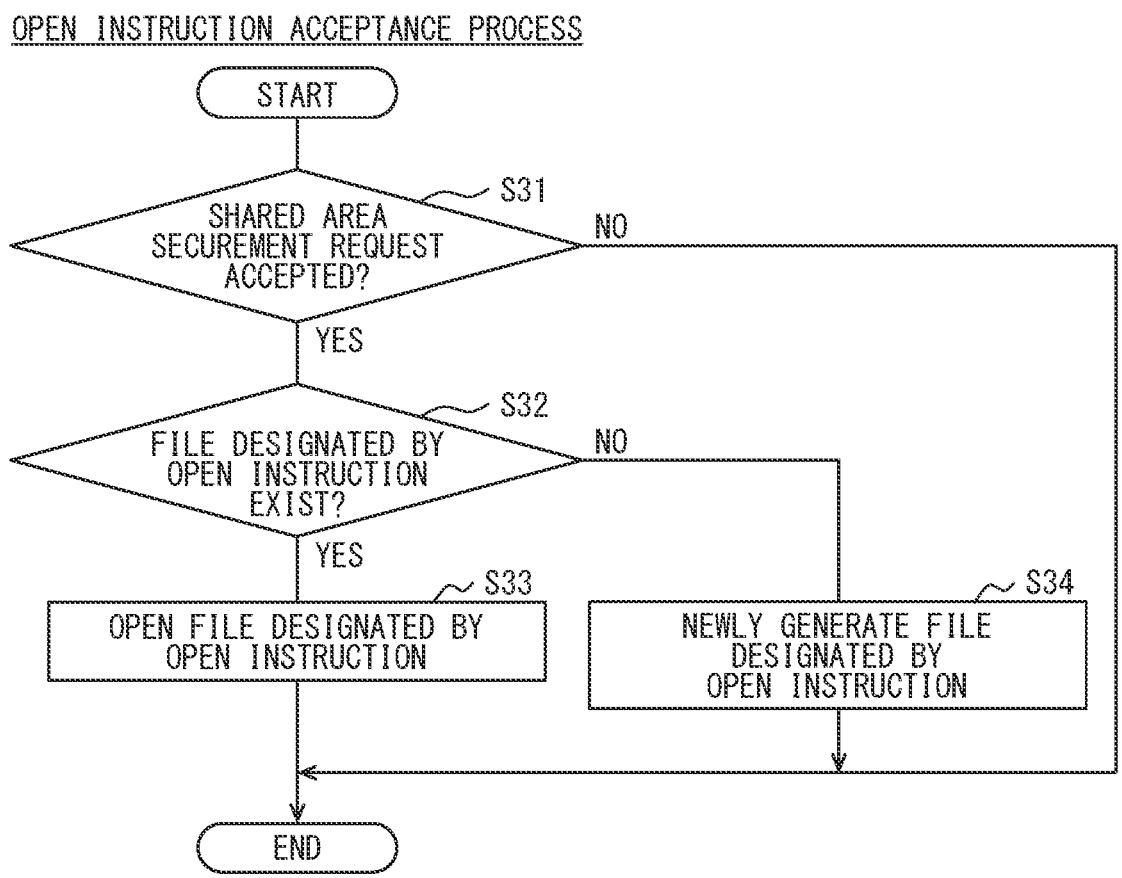
FIG. 8 is a flowchart showing an open instruction acceptance process.

(4) Open Instruction Acceptance Process (See FIG. 8)

When a condition for starting an open instruction acceptance process is satisfied, the controller 2 starts the open instruction acceptance process, and determines whether the open instruction has been accepted from the application (S31). When determining that the open instruction has not been accepted from the application (S31: NO), the controller 2 ends the open instruction acceptance process and waits until a condition for starting the next open instruction acceptance process is satisfied.

When determining that the open instruction from the application has been accepted (S31: YES), the controller 2 determines whether the file designated by the accepted open instruction exists (S32). When determining that the file designated by the accepted open instruction exists (S32: YES), the controller 2 opens the file (S33), ends the open instruction acceptance process, and waits until the condition for starting the open instruction acceptance process is satisfied. When determining that the file designated by the open instruction does not exist (S32: NO), the controller 2 generates a new file (S34), ends the open instruction acceptance process, and waits until the condition for starting the open instruction acceptance process is satisfied.

Figure 9:
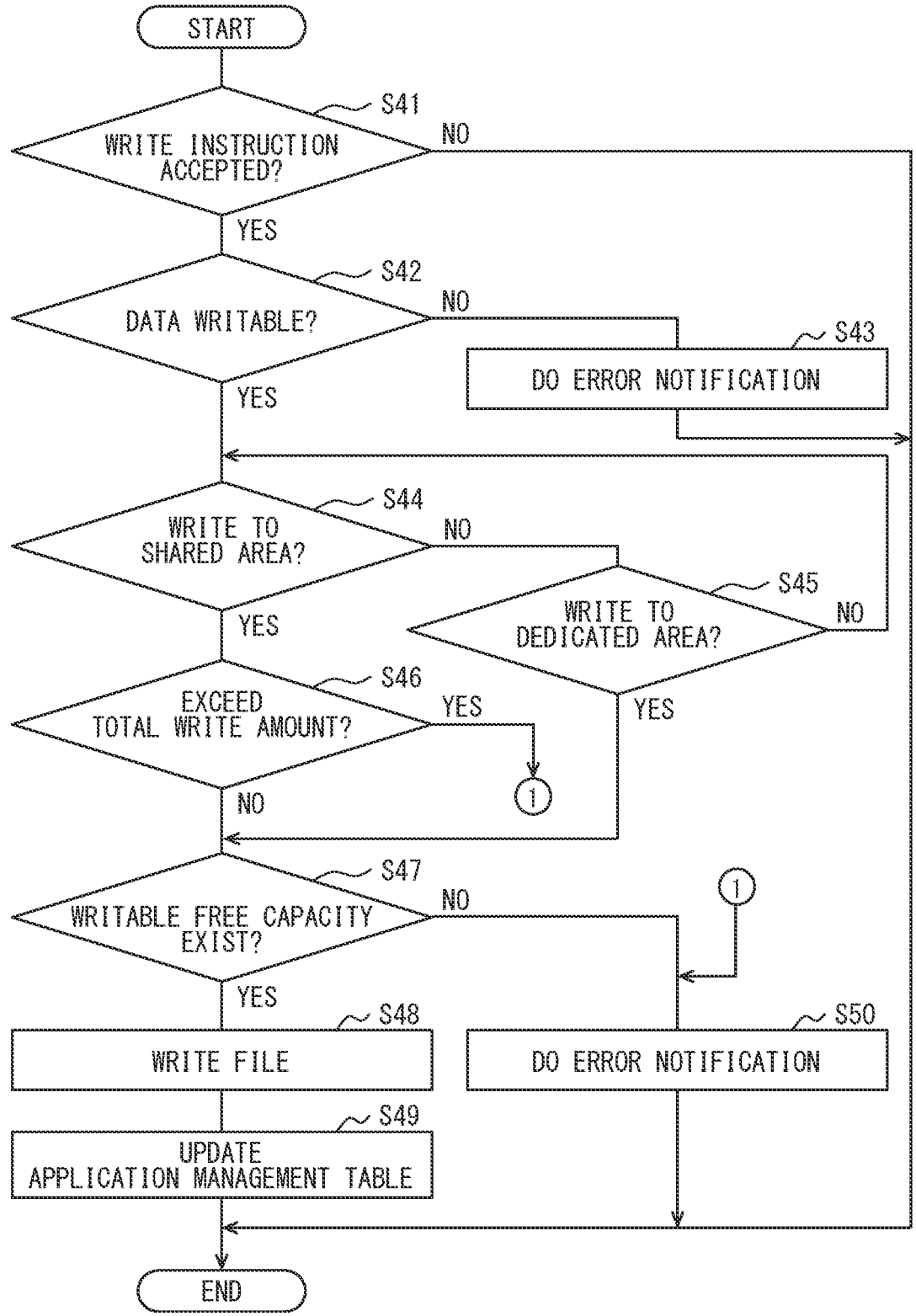
FIG. 9 is a flowchart showing a write instruction acceptance process.

(5) Write Instruction Acceptance Process (See FIG. 9)

The write instruction acceptance process is a process for setting the contents of the file opened or newly generated by the open instruction acceptance process to an amendable state or an editable state. The data stored in the storage 3 is not changed at the stage of the write instruction acceptance process. When a condition for starting the write instruction acceptance process is satisfied, the controller 2 starts the write instruction acceptance process, and determines whether the write instruction has been accepted from the application (S41). When determining that the write instruction has not been accepted from the application (S41: NO), the controller 2 ends the write instruction acceptance process and waits until the condition for starting the next write instruction acceptance process is satisfied.

When determining that the write instruction has been accepted from the application (S41: YES), the controller 2 determines whether data can be written based on the write limit table (S42). When determining that the data is not writable (S4: NO), the controller 2 provides an error notification (S43), ends the write instruction acceptance process, and waits until the condition for starting the next write instruction acceptance process is satisfied.

When determining that the data is writable (S42: YES), the controller 2 determines to which of the shared area and the dedicated area the data is to be written (S44, S45). When determining that the writing destination is the shared area (S44: YES), the controller 2 refers to the written amount and determines whether a value obtained by adding the current write amount to the written amount exceeds the total write amount (S46). When determining whether the value obtained by adding the current write amount to the written amount exceeds the total write amount (S46: YES), the controller 2 provides the error notification also in this case (S43), ends the write instruction acceptance process, and waits until the condition for starting the next write instruction acceptance process is satisfied.

When determining that the value obtained by adding the current write amount to the written amount does not exceed the total write amount (S46: NO), the controller 2 determines whether the writable free capacity exists (S47). When determining whether the writable free capacity exists (S47: YES), the controller 2 writes the file (S48), notifies the application of the write result (S49), ends the write instruction acceptance process, and waits until the condition for starting the next write instruction acceptance process is satisfied.

When determining that the writable free capacity does not exist (S47: NO), the controller 2 provides the error notification also in this case (S50), ends the write instruction acceptance process, and waits until the condition for starting the next write instruction acceptance process is satisfied. When determining that the write is write to the dedicated area (S45: YES), the controller 2 executes the process in S47 and subsequent processes without executing the process in S46.

Figure 10:
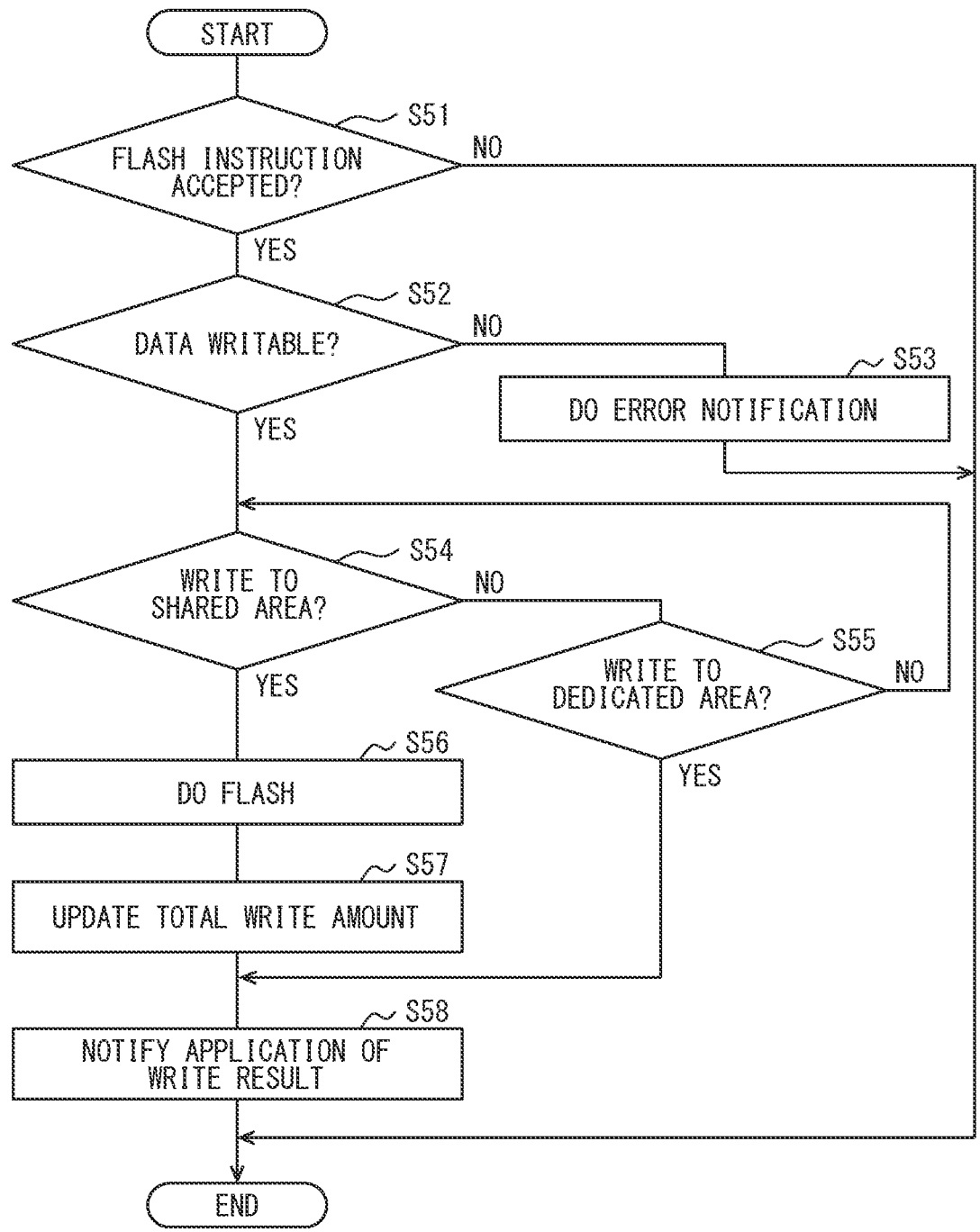
FIG. 10 is a flowchart showing a flash instruction acceptance process.

(6) Flash Instruction Acceptance Process (See FIG. 10)

The flash instruction acceptance process is a process of synchronizing the contents of the file and the data stored in the storage 3. When a condition for starting the flash instruction acceptance process is satisfied, the controller 2 starts the flash instruction acceptance process, and determines whether the flash instruction has been accepted from the application (S51). When determining that the flash instruction has not been accepted from the application (S51: NO), the controller 2 ends the flash instruction acceptance process and waits until the condition for starting the next flash instruction acceptance process is satisfied.

When determining that the flash instruction has been accepted from the application (S51: YES), the controller 2 determines whether data can be written based on the write limit table (S5). When determining that the data is not writable (S5: NO), the controller 2 provides the error notification (S53), ends the flash instruction acceptance process, and waits until the condition for starting the next flash instruction acceptance process is satisfied.

When determining that the data is writable (S52: YES), the controller 2 determines to which of the shared area and the dedicated area the data is to be written (S54, S55). When determining whether the write is write to the shared area (S54: YES), the controller 2 performs flash (S56), updates the write amount (S57), notifies the application of the write result (S58), ends the flash instruction acceptance process, and waits until the condition for starting the next flash instruction acceptance process is satisfied.

When determining whether the write is write to the dedicated area (S55: YES), the controller 2 performs flash (S56), notifies the application of the write result (S58), ends the flash instruction acceptance process, and waits until the condition for starting the next flash instruction acceptance process is satisfied.

Figure 11:
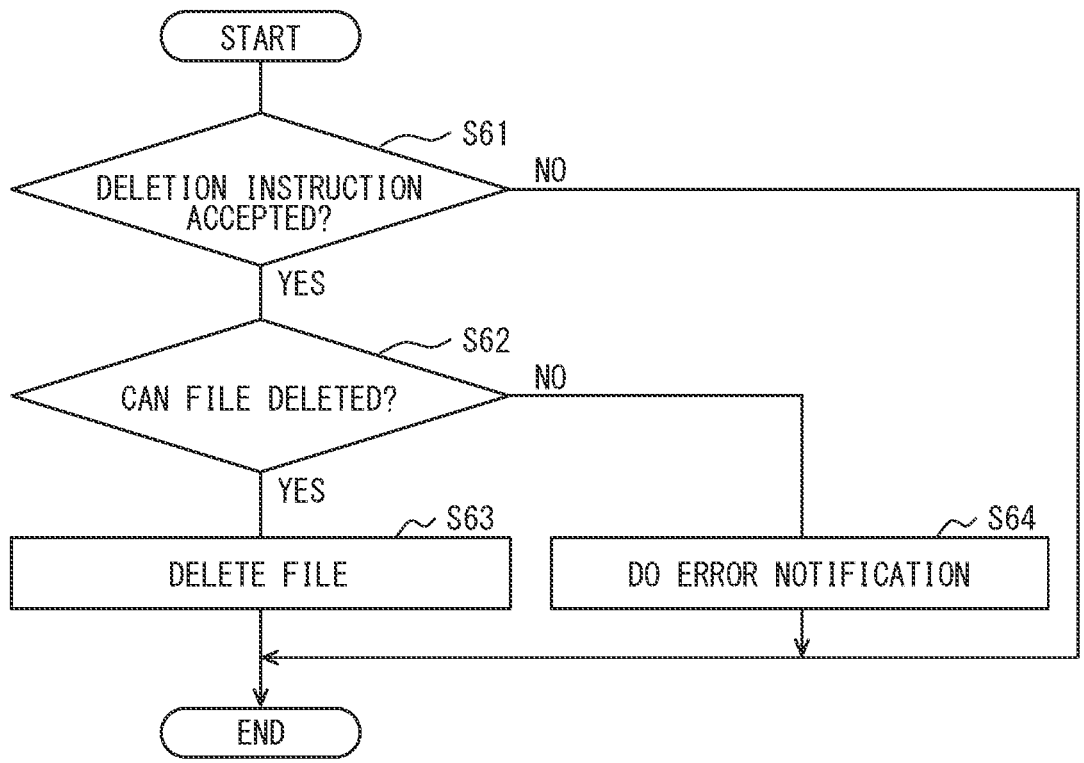
FIG. 11 is a flowchart showing a deletion instruction acceptance process.

(7) Deletion Instruction Acceptance Process (See FIG. 11)

When a condition for starting the deletion instruction acceptance process is satisfied, the controller 2 starts the deletion instruction acceptance process, and determines whether the deletion instruction has been accepted from the application (S61). When determining that the deletion instruction has not been accepted from the application (S61: NO), the controller 2 ends the deletion instruction acceptance process and waits until the condition for starting the next deletion instruction acceptance process is satisfied.

When determining that the deletion instruction has been accepted from the application (S61: YES), the controller 2 determines whether the file can be deleted based on the write limit table (S62). When determining that the file can be deleted (S62: YES), the controller 2 deletes the file (S63), ends the deletion instruction acceptance process, and waits until the condition for starting the next deletion instruction acceptance process is satisfied. When determining that the file cannot be deleted (S62: NO), the controller 2 provides the error notification (S64), ends the deletion instruction acceptance process, and waits until the condition for starting the next deletion instruction acceptance process is satisfied.

Figure 12:
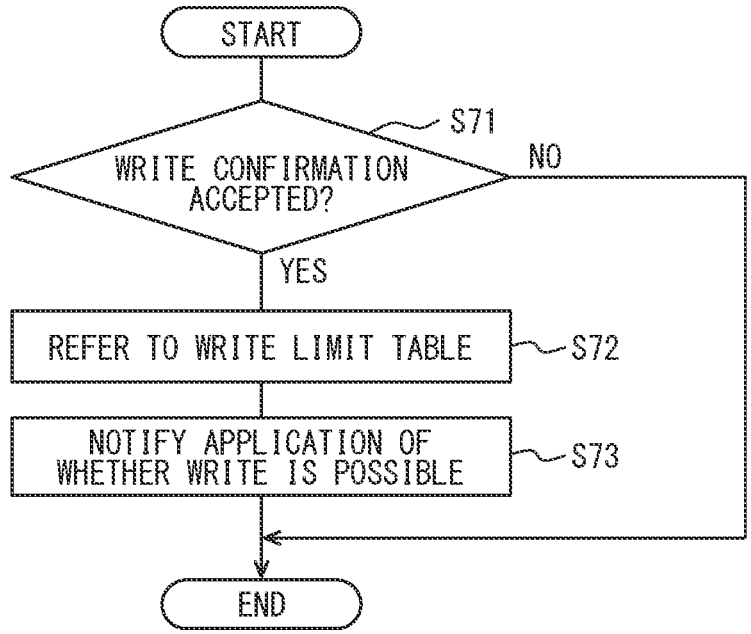
FIG. 12 is a flowchart showing a write confirmation acceptance process.

(8) Write Confirmation Acceptance Process (See FIG. 12)

When a condition for starting the write confirmation acceptance process is satisfied, the controller 2 starts the write confirmation acceptance process, and determines whether the write confirmation has been accepted from the application (S71). The write confirmation indicates whether the write is possible, for example. When determining that the write confirmation has not been accepted from the application (S71: NO), the controller 2 ends the write confirmation acceptance process and waits until the condition for starting the next write confirmation acceptance process is satisfied.

When determining whether the write confirmation has been accepted from the application (S71: YES), the controller 2 refers to the write limit table (S72), notifies the application of whether the write is possible (S73), ends the write confirmation acceptance process, and waits until the condition for starting the next write confirmation acceptance process is satisfied.

As described above, according to the present embodiment, the following effects can be obtained. In the ECU 1, the limit on the data write to the storage 3 is set based on the health status information regarding the life time consumption of the storage 3. The application using the storage 3 is notified of the use limit of the storage 3 according to the set write limit. By notifying the application using the storage 3 of the use limit of the storage 3 according to the write limit, it is possible to limit the access from the application to the storage 3. Thereby, it is possible to appropriately extend the life time of the storage 3 attached to the subject ECU.

In the ECU 1, when the life time consumption information of the storage 3 reaches the first threshold, the limit on the data write to the shared area is set. It is possible to limit the write to the shared area by using the first threshold as the boundary. In the ECU 1, when the life time consumption information of the storage 3 reaches the second threshold, the limit on the data write to the dedicated area is set. It is possible to limit the write to the dedicated area by using the second threshold as the boundary. In this case, by varying the second threshold according to the importance level of data, it is possible to limit the write of data having the relatively high importance level when the life time consumption becomes relatively high, and limit the write of data having the relatively low importance level even when the life time consumption becomes relatively low.

In the ECU 1, the second threshold, which serves as a reference for setting the limit on the data writing to the dedicated area, is set to a value greater than the first threshold, which serves as a reference for setting the limit on the data write to the shared area. It is possible to prioritize the use of the storage 3 by applications using the dedicated area over the use of the storage 3 by the application using the shared area.

While the present disclosure has been described based on the embodiments, the present disclosure is not limited to the embodiment or structure described herein. The present disclosure includes various modification examples or variations within the scope of equivalents. Furthermore, various combinations and formations, and other combinations and formations including one, more than one or less than one element may be included in the scope and the spirit of the present disclosure.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitional tangible recording medium as an instruction to be executed by the computer.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. An electronic control unit including a storage that has a shared area capable of being shared and used by a plurality of unspecified applications and a dedicated area capable of being used by a predetermined specific application, the electronic control unit comprising:
   a life time consumption information acquisition unit configured to acquire life time consumption information related to life time consumption of the storage;
   a write limit setting unit configured to
      set a shared area write limit on data write to the shared area when the life time consumption information reaches a first threshold, and
      set a dedicated area write limit on data write to the dedicated area when the life time consumption information reaches a second threshold higher than the first threshold; and
   a use limit notification unit configured to notify an application using the storage of a use limit of the storage according to the shared area write limit or the dedicated area write limit.

2. The electronic control unit according to claim 1, wherein
   the storage is an embedded Multi Media Card (eMMC) conforming to a standard of Joint Electron Device Engineering Council (JEDEC),
   a version of the standard is 5.0 or later, and
   the life time consumption information acquisition unit is configured to acquire, as the life time consumption information, information according to a numerical number of data write times.

3. The electronic control unit according to claim 1, further comprising:
   a limit storage that stores a write limit table indicating the shared area write limit or the dedicated area write limit; and
   a limit update unit configured to update the shared area write limit or the dedicated area write limit stored in the write limit table,
   wherein
   when the limit update unit updates the shared area write limit or the dedicated area write limit, the use limit notification unit notifies an application using the storage of the use limit of the storage according to the updated shared area write limit or the updated dedicated area write limit.

4. The electronic control unit according to claim 1, wherein
the write limit setting unit is configured to set, for an application using the dedicated area, a limit on data write to the storage based on the life time consumption information and a data importance level.

5. The electronic control unit according to claim 1, wherein
the write limit setting unit is configured to set a total write amount for an application using the shared area.

6. A use limit notification method performed in an electronic control unit including a storage that has a shared area capable of being shared and used by a plurality of unspecified applications and a dedicated area capable of being used by a predetermined specific application, the method comprising:
acquiring life time consumption information related to life time consumption of the storage;
storing a first threshold with respect to the life time consumption information and a second threshold higher than the first threshold;
determining that the life time consumption information has reached the first threshold;
setting a shared area write limit on data write to the shared area in response to a determination that the life time consumption information has reached the first threshold;
determining that the life time consumption information has reached the second threshold;
setting a dedicated area write limit on data write to the dedicated area in response to a determination that the life time consumption information has reached the second threshold; and
notifying an application using the storage of a use limit of the storage according to the shared area write limit or the dedicated area write limit.

7. A computer-readable non-transitory storage medium storing a use limit notification program that causes a controller of an electronic control unit including a storage that has a shared area capable of being shared and used by a plurality of unspecified applications and a dedicated area capable of being used by a predetermined specific application, to:
acquire life time consumption information related to life time consumption of the storage;
set a shared area write limit on data write to the shared area when the life time consumption information reaches a first threshold;
set a dedicated area write limit on data write to the dedicated area when the life time consumption information reaches a second threshold higher than the first threshold; and
notify an application using the storage of a use limit of the storage according to the shared area write limit or the dedicated area write limit.

8. The electronic control unit according to claim 1, further comprising
a processor that serves as the life time consumption information acquisition unit, the write limit setting unit, and the use limit notification unit.

9. The electronic control unit according to claim 3, further comprising a processor that serves as the limit update unit.

* * * * *